United States Patent
Culp et al.

(10) Patent No.: US 7,962,536 B2
(45) Date of Patent: *Jun. 14, 2011

(54) SYSTEM AND METHOD FOR REMOTE MONITORING AND CONTROLLING OF FACILITY ENERGY CONSUMPTION

(75) Inventors: Charles H. Culp, College Station, TX (US); David E. Claridge, College Station, TX (US); Jeffrey S. Haberl, College Station, TX (US); William D. Turner, College Station, TX (US)

(73) Assignee: The Texas A&M University System, College Station, TX (US)

( * ) Notice: Subject to any disclaimer, the term of this patent is extended or adjusted under 35 U.S.C. 154(b) by 502 days.

This patent is subject to a terminal disclaimer.

(21) Appl. No.: 12/099,271

(22) Filed: Apr. 8, 2008

(65) Prior Publication Data
US 2009/0012654 A1  Jan. 8, 2009

Related U.S. Application Data

(63) Continuation of application No. 10/004,988, filed on Dec. 3, 2001, now Pat. No. 7,356,548.

(51) Int. Cl.
*G06F 17/30* (2006.01)
(52) U.S. Cl. ............... 707/999.2; 700/291; 700/297
(58) Field of Classification Search ........... 707/999.2, 707/999.104, 999.107; 700/286, 291, 297; 705/8, 412
See application file for complete search history.

(56) References Cited

U.S. PATENT DOCUMENTS

| | | | |
|---|---|---|---|
| 4,319,327 A | 3/1982 | Higashiyama et al. | 701/104 |
| 5,115,967 A | 5/1992 | Wedekind | 236/46 R |
| 5,216,623 A | 6/1993 | Barrett et al. | 364/550 |
| 5,566,084 A | 10/1996 | Cmar | 364/492 |
| 5,651,264 A | 7/1997 | Lo et al. | 62/230 |
| 5,852,560 A | 12/1998 | Takeyama et al. | 364/468.03 |
| 6,014,716 A | 1/2000 | Ohara | 710/14 |
| 6,056,691 A | 5/2000 | Urbano et al. | 600/443 |
| 6,088,688 A | 7/2000 | Crooks et al. | 705/412 |
| 6,178,362 B1 | 1/2001 | Woolard et al. | 700/295 |
| 6,216,956 B1 | 4/2001 | Ehlers et al. | 236/47 |
| 6,366,889 B1 * | 4/2002 | Zaloom | 705/7 |
| 6,439,469 B1 | 8/2002 | Gruber et al. | 237/8 R |
| 6,577,962 B1 * | 6/2003 | Afshari | 702/61 |
| 6,785,592 B1 * | 8/2004 | Smith et al. | 700/291 |
| 6,937,946 B1 * | 8/2005 | Culp et al. | 702/62 |
| 6,996,508 B1 * | 2/2006 | Culp et al. | 703/2 |
| 7,225,089 B2 * | 5/2007 | Culp et al. | 702/61 |
| 7,356,548 B1 * | 4/2008 | Culp et al. | 1/1 |
| 7,552,033 B1 * | 6/2009 | Culp et al. | 703/2 |

(Continued)

OTHER PUBLICATIONS

U.S. Appl. No. 10/027,943, filed Dec. 20, 2001, by Charles H. Culp et al., Dec. 20, 2001.
"Data Mining to Improve Energy Efficiency in Buildings," Sep. 2001 (website of knowledgeprocesssoftware.com/newweb/ConterDet.), Sep. 2001.
IEEE Std. 1249-1996: IEEE Guide for Computer-Based Control for Hydroelectric Power Plant Automation, Dec. 10, 1996, The Institute of Electrical and Electronic Engineers, Inc., Dec. 10, 1996.

*Primary Examiner* — Jean M Corrielus
(74) *Attorney, Agent, or Firm* — Baker Botts L.L.P.

(57) ABSTRACT

A method for remote monitoring and controlling of energy consumption of a facility includes receiving energy consumption data associated with the facility at a processor disposed remotely from the facility. The method also includes receiving environmental data associated with the facility. The method includes determining whether an operating parameter of an energy consumption system of the facility requires modification to increase efficiency using the energy consumption data and the environmental data. The method further includes automatically modifying the operating parameter of the energy consumption system corresponding to the required modification.

37 Claims, 4 Drawing Sheets

U.S. PATENT DOCUMENTS

| | | | |
|---|---|---|---|
| 2003/0061091 A1 | 3/2003 | Amaratunga et al. | 705/10 |
| 2005/0228599 A1* | 10/2005 | Culp et al. | 702/62 |
| 2009/0012654 A1* | 1/2009 | Culp et al. | 700/291 |
| 2009/0043548 A1* | 2/2009 | Beekhuis | 703/3 |

* cited by examiner

SYSTEM AND METHOD FOR REMOTE MONITORING AND CONTROLLING OF FACILITY ENERGY CONSUMPTION

RELATED APPLICATIONS

This application is a continuation of U.S. application Ser. No. 10/004,988, filed Dec. 3, 2001, entitled "System and Method for Remote Monitoring and Controlling of Facility Energy Consumption," now U.S. Pat. No. 7,356,548.

TECHNICAL FIELD OF THE INVENTION

This invention relates in general to the field of energy systems and, more particularly, to a system and method for remote monitoring and controlling of facility energy consumption.

BACKGROUND OF THE INVENTION

Schools, office buildings, homes, department stores, hospitals, and other types of facilities consume energy in varying amounts using a variety of different types of systems and components. For example, energy consumption systems and components may be used for environmental control, such as heating and cooling, for lighting, for security system applications, for computer usage applications, and for a variety of other energy consumption applications corresponding to the particular type of facility.

Because the types of facilities vary to a generally large degree, the energy usage associated with each type of facility also varies to a generally large degree. For example, energy consumption systems and components associated with homes are different than the energy consumption systems and components associated with an office building or hospital, and generally use less energy per unit of conditioned area than the systems and components of the office building or hospital.

Accordingly, because energy usage varies among different types of facilities, different energy consumption systems and components are designed to accommodate the various energy usage requirements of a particular facility. Additionally, in order to evaluate the efficiency of a particular energy consumption system or component, information associated with the facility and the energy consumption systems and/or components must be determined, as well as the amount of energy used by the particular energy consumption systems and/or components. This information is also generally necessary to determine which energy consumption systems and/or components require repair, modification, or replacement. Obtaining the required information, however, generally requires access to the facility and/or the energy consumption systems and components. Accordingly, obtaining the required information is generally expensive and time consuming.

Additionally, controlling the energy consumption systems and components of a facility also generally requires expensive and time-consuming site visits to the facility. For example, changes in energy consumption efficiency may require changing the operating parameters of an energy consumption component or system, thereby requiring physical inspection, repair or modification to the component or system.

SUMMARY OF THE INVENTION

Accordingly, a need has arisen for an improved system and method of remotely monitoring and controlling energy consumption associated with a variety of facilities. The present invention provides a system and method for remote monitoring and controlling of facility energy consumption that addresses shortcomings and disadvantages associated with prior systems and methods.

According to one embodiment of the present invention, a method for remote monitoring and controlling of energy consumption of a facility includes receiving energy consumption data associated with the facility at a processor disposed remotely from the facility. The method also includes receiving environmental data associated with the facility. The method includes determining whether an operating parameter(s) of an energy consumption system of the facility requires modification to increase efficiency using the energy consumption data and the environmental data. The method further includes automatically modifying the operating parameter of the energy consumption system corresponding to the required modification.

According to another embodiment of the present invention, a system for remote monitoring and controlling of energy consumption of a facility includes a processor, a database coupled to the processor, a memory coupled to the processor, an analysis engine residing in the memory and executable by the processor, and a control engine residing in the memory and executable by the processor. The database is operable to receive and store energy consumption data associated with the facility. The analysis engine is operable to evaluate the energy consumption data and determine whether energy consumption operating parameters require modification to increase efficiency. The control engine is operable to initiate operating parameter modification of an energy consumption system of the facility in response to a desired operating parameter modification.

The present invention provides several technical advantages. For example, according to one embodiment of the present invention, energy consumption data is acquired using data collectors disposed at the facility. The energy consumption data may be retrieved from the data collectors via the Internet or other communications network. Environmental data may also be retrieved associated with the facility and corresponding to the energy consumption data. The system evaluates the energy consumption data to determine whether an operating parameter of an energy consumption system of the facility may be modified to obtain an increase in energy consumption efficiency. The desired operating parameter(s) modification may then be initiated and processed remotely from the facility. Accordingly, costly and time consuming facility site visits are substantially reduced or eliminated.

Another technical advantage of the present invention includes increased energy consumption data integrity. For example, according to one embodiment of the invention, the rate of energy consumption data collection may be monitored and modified remotely from the facility, thereby providing enhanced energy consumption data acquisition in response to predetermined events. Additionally, the data collectors disposed at the facility may be configured to automatically transmit the energy consumption data at predetermined time periods or in response to a predetermined event.

Other technical advantages are readily apparent to those skilled in the art from the following figures, descriptions, and claims.

BRIEF DESCRIPTION OF THE DRAWINGS

For a more complete understanding of the present invention, and the advantages thereof, reference is now made to the following description, taken in conjunction with the accompanying drawings, wherein like reference numerals represent like parts, in which.

DETAILED DESCRIPTION OF THE INVENTION

Figure 1:
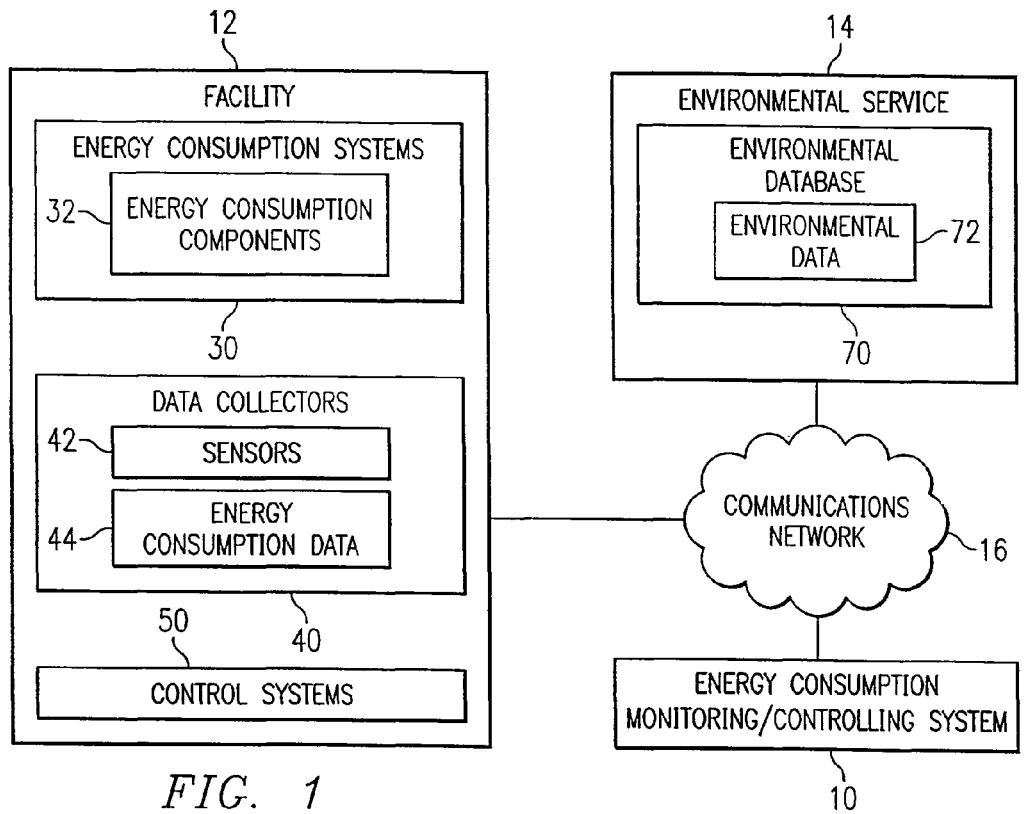
FIG. 1 is a block diagram illustrating a system for remote monitoring and controlling of facility energy consumption in accordance with an embodiment of the present invention.

FIG. 1 is a block diagram in which a system 10 for remote monitoring and controlling of facility energy consumption in accordance with an embodiment of the present invention is illustrated. In the illustrated embodiment, the system 10 is coupled to a facility 12 and an environmental service 14 via a communications network 16. The communications network 16 may be different networks, or the same network, and may include any Internet, intranet, extranet, or similar communication network. The communications network 16 provides an electronic medium for transmitting and receiving information between the system 10, the facility 12, and the environmental service 14. However, it should be understood that other electronic and non-electronic modes of communication may also be used for transmitting and receiving information between the system 10, the facility 12, and the environmental service 14.

The facility 12 comprises a building, structure, location, worksite, plant, vicinity or other area comprising energy consuming applications or devices. The facility 12 generally includes one or more energy consumption systems 30 such as, but not limited to, heating and cooling systems, lighting systems, computer systems, medical systems, product manufacturing systems, generating equipment and/or a variety of other types of energy consuming applications or devices. Accordingly, each energy consumption system 30 may include one or more discrete energy consumption components 32. For example, a heating/cooling energy consumption system 30 may include energy consumption components 32 such as boilers, heat exchangers, fans, compressors, and other related components. Accordingly, depending on the type of energy consumption system 30, the energy consumption components 32 relate to the function and operation of the particular energy consumption system 30.

The facility 12 may also include one or more data collectors 40 for acquiring energy consumption information associated with each of the systems 30 and/or components 32. The data collectors 40 may be coupled to or disposed proximate to one or more of the energy consumption systems 30 and/or components 32, or may be disposed remotely from the systems 30 and components 32. Each data collector 40 may also include or be coupled to a sensor 42 for acquiring and/or determining energy consumption or energy usage corresponding to the energy consumption systems 30 and components 32. For example, each sensor 42 may be coupled to or disposed proximate to a corresponding energy consumption component 32 and/or system 30 to acquire energy consumption or other information associated with the operation and efficiency of a particular energy consumption system 30 and/or component 32, such as, but not limited to, electrical usage, water flow rates, internal and external temperature data, internal and external humidity values, wind speed and direction, precipitation, and cloud conditions. Each sensor 42 may also include processing, memory, communication, and other functional capabilities for collecting, processing, manipulating, storing, and/or transmitting the acquired information associated with a particular energy consumption component 32 and/or system 30. For example, multiple sensors 42 may be coupled together to accommodate sharing of accumulated information, thereby resulting in a decrease of information required to be acquired and processed by each individual sensor 42.

Each data collector 40 may also include processing, memory, communication, and other functional capabilities for receiving, manipulating, processing, storing and/or transmitting the energy consumption and other information acquired by the sensors 42. For example, each data collector 40 may receive, process and store energy usage and/or environmental information associated with a particular energy consumption system 30 and/or component 32 as energy consumption data 44. The energy consumption data 44 may then be shared between one or more other data collectors 40, transmitted to a central monitoring station, or otherwise stored, transferred and/or manipulated. Each data collector 40 may also be coupled to other data collectors 40 to accommodate sharing of accumulated information, thereby resulting in a decrease of information required to be acquired and processed by each individual data collector 40. Additionally, the data collector 40 network may also be used to validate information. For example, each of the data collectors 40 may be configured to poll other data collectors 40 to validate information acquired by the collectors 40 and/or sensors 42.

The data collectors 40 may also be configured to initiate information transfer to the system 10 or other data collectors 40 and/or sensors 42 upon acquiring or computing a predetermined information value or series of values. The data collectors 40 may also be configured to provide back-up applications to other data collectors 40 and/or sensors 42. For example, a set of risk conditions may be determined such that, if a particular risk condition occurs, information loss or compromise may result. The risk conditions may include, but not be limited to, low battery power, internal diagnostic conditions or results, or other conditions that may be associated with data loss or error. Thus, if a risk condition results or is anticipated, the data collector 40 may transmit stored or acquired information to another data collector 40 as a back-up application.

The data collectors 40 and/or sensors 42 may also be configured to manipulate the acquired information or perform predetermined tasks corresponding to acquired information in response to predetermined events or conditions. For example, information may be acquired by the data collector 40 and/or sensor 42 at a predetermined rate. Unless a predetermined event or condition occurs, the acquired information may be stored in a buffer and processed into a less storage intensive data representation after a predetermined time interval. If a predetermined event or condition occurs, the information may be stored and transmitted to the system 10. For example, if the event does not occur, acquired information or values may be averaged for a predetermined time interval, and the averaged value transmitted to the system 10. If the event occurs, however, information acquired before and after the event may be stored and transmitted to the system 10, such as a predetermined quantity of values occurring immediately before and immediately after the event.

The facility 12 may also include one or more control systems 50 for regulating the operating parameters of the energy consumption systems 30 and components 32. The control system 50 may include processing, memory, communication, and other functional capabilities for collecting, processing, manipulating, storing, and/or transmitting control information and/or signals corresponding to the operating parameters of the energy consumption systems 30 and components 32. For example, in a heating/cooling application, the control system 50 may comprise a thermostat or other type of regulating device for controlling the activation and deactivation of a cooling/heating system 30 for maintaining an internal area of the facility 12 at a desired temperature or within a desired temperature range. However, it should be understood that other types of control systems 50 may be used corresponding to the type and functional applications of the systems 30 and components 32.

The environmental service 14 comprises a weather service, meteorological service, or other service containing weather and/or environmental information, such as, but not limited to, the National Weather Service or other regional or local weather services or stations. The environmental service 14 generally includes an environmental database 70 containing environmental data 72 corresponding to particular periods of time and associated with the vicinity of the facility 12. The environmental data 72 may include temperature data, humidity measurements, wind speed and direction, precipitation, cloud conditions, and other environmental information that may affect energy usage or consumption during a particular period of time. The environmental data 72 may also include forecast information corresponding to the facility 12. For example, the environmental data 72 may include forecast information associated with anticipated temperatures, humidity, wind speed and direction, precipitation, cloud conditions, and other environmental information that may affect future energy usage or consumption of the facility 12.

Briefly, the system 10 retrieves energy consumption information associated with the facility 12 via the communications network 16. For example, the system may retrieve information from the data collectors 40 and/or the sensors 42. The data collectors 40 and/or sensors 42 may also "call out" or initiate contact with the system 10 for transmitting the energy consumption information to the system 10. Additionally, the system 10 retrieves environmental data 72 via the communications network 16 from the environmental service 14. Using the energy consumption information and the environmental data 72, the system 10 is used to remotely analyze various operating parameters of the energy consumption systems 30 and/or components 32 to determine operating efficiency, repair indications, or replacement requirements. Using the energy consumption information and the environmental data 72, the system 10 is also used to control the operating parameters of the energy consumption systems 30 and components 32, to obtain a desired operating efficiency of the systems 30 and components 32, or to regulate the operating parameters of the systems 30 and components 32 in anticipation of forecasted environmental changes. The system 10 is described in greater detail below in connection with FIGS. 2-5.

Figure 2:
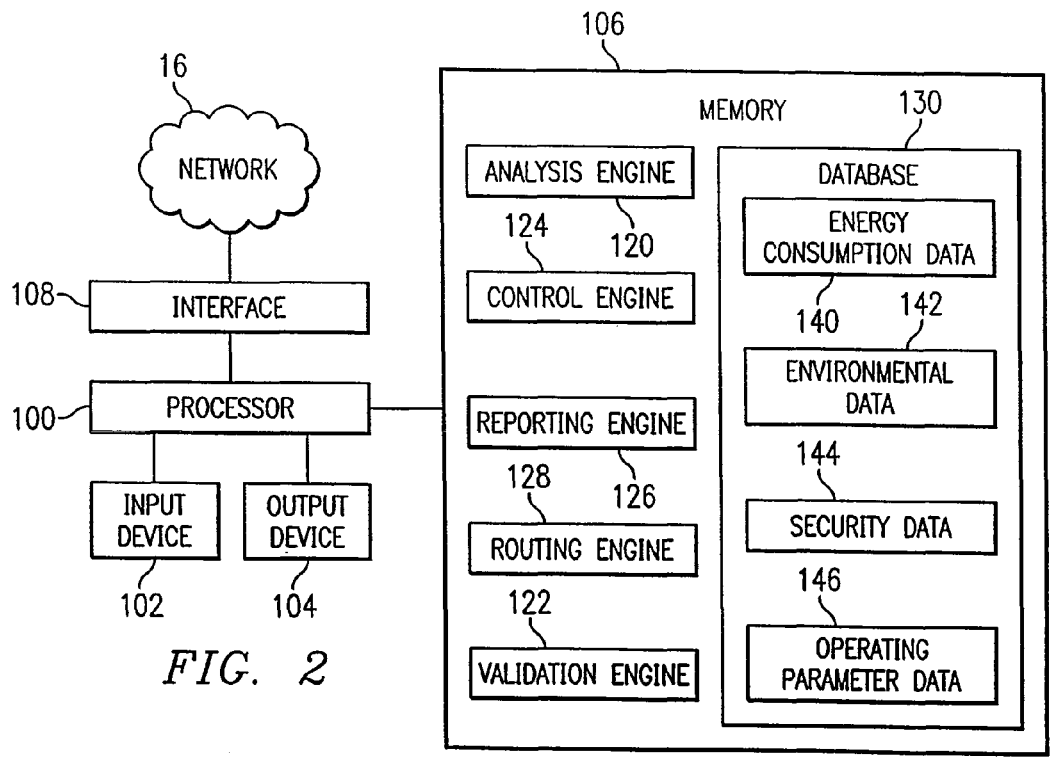
FIG. 2 is another block diagram illustrating the system for remote monitoring and controlling of facility energy consumption in accordance with an embodiment of the present invention.

FIG. 2 is a block diagram illustrating the system 10 in accordance with an embodiment of the present invention. In this embodiment, system 10 includes a processor 100, an input device 102, an output device 104, and a memory 106. The present invention also encompasses computer software that may be stored in memory 106 and executed by processor 100. The computer software may also be stored in a variety of other types of storage media including, but not limited to, floppy disk drives, hard drives, CD-ROM disk drives, or magnetic tape drives. Information, such as environmental data 72, energy consumption data 44, or other types of information, may be received from a user of system 10 using a keyboard or any other type of input device 102. Output values or results may be output to a user of system 10 through output device 104, which may include a display, printer, or any other type of output device. The system 10 may also include an interface 108 for communicating via the communications network 16.

System 10 includes an analysis engine 120, a validation engine 122, a control engine 124, a reporting engine 126, and a routing engine 128, which are computer software programs. In FIG. 2, the analysis engine 120, the validation engine 122, the control engine 124, the reporting engine 126, and the routing engine 128 are illustrated as being stored in the memory 106, where they can be executed by the processor 100. However, the analysis engine 120, validation engine 122, control engine 124, reporting engine 126, and routing engine 128 may also be stored on a variety of other types of storage media.

System 10 also includes a database 130. In FIG. 2, the database 130 is illustrated as being stored in the memory 106, where it may be accessed by the processor 100. However, the database 130 may also be stored on a variety of other types of storage media. In the illustrated embodiment, the database 130 includes energy consumption data 140, environmental data 142, security data 144, and operating parameter data 146.

The energy consumption data 140 includes information associated with energy usage of the systems 30 and components 32 of the facility 12. For example, the system 10 may retrieve energy consumption data 44 from the sensors 42 and/or the data collectors 40 and store the information as energy consumption data 140 in the database 130. As described above, the energy consumption data 140 may include information associated with electrical or other types of power consumption, fuel consumption, water flow rates, and/or other information associated with energy consumption by the systems 30 and components 32 of the facility 12.

The environmental data 142 may include information associated with environmental conditions internal and external to the location of the facility 12, such as temperatures, humidity, wind speed and direction, precipitation, cloud conditions, and other environment-related information. The environmental data 142 may be downloaded to the database 130 from the environmental service 14 via the communications network 16. The environmental data 142 may also be retrieved directly from the facility 12 via the communications network 16. For example, as described above, the information acquired and/or processed by the sensors 42 and/or the data collectors 40 may include information associated with the internal and external environmental conditions proximate to and affecting the operating parameters of the energy consumption systems 30 and/or components 32. It should be understood, however, that the environmental data 142 may be otherwise obtained and/or stored within the scope of the present invention.

The security data 144 includes information associated with access and security measures associated with the energy consumption of the facility 12. For example, the system 10 may be operated and/or maintained by a party other than the owner and/or occupier of the facility 12. However, access to the energy consumption information by the owner and/or occupier of the facility 12 may be desired. Thus, the security data 144 may include information associated with access via the communications network 16 or otherwise to the data collectors 40, the sensors 42, the energy consumption data 44 and/or the control systems 50. For example, the security data 144 may include information associated with the personnel authorized to access the information, levels of access, security or access codes corresponding to each of the authorized personnel and access level, records indicating access of the information by each of the authorized personnel, information associated with failed attempts to access the information, and other security related information. The security data 144 may also include encryption information associated with the transfer of information via the communications network 16 to and from the facility 12.

The operating parameter data 146 includes information associated with the operating parameters of the energy consumption systems 30 and/or components 32 of the facility 12. For example, the operating parameter data 146 may include information associated with operating time periods or intervals, operating activation and deactivation controls and limits, and other control parameters associated with the systems 30 and components 32 of the facility 12.

In operation, the energy consumption data 140, the environmental data 142, and the operating parameter data 146 are retrieved and stored in the database 130. As described above, the data collectors 40 may also automatically transmit or periodically initiate communication with the system 10 for providing the information to the system 10. The analysis engine 120 evaluates energy consumption efficiency, operating parameter performance, and a variety of other energy consumption applications corresponding to the systems 30 and components 32. For example, using the energy consumption data 140 and the environmental data 142, the analysis engine 120 determines the operating efficiency of the systems 30 and/or components 32 of the facility 12. Thus, for environmental conditions both internal and external to the facility 12, the analysis engine 120 determines operating efficiency of the systems 30 and components 32 and determines whether modifications to the operating parameters of the systems 30 and components 32 may be required to increase operational efficiency.

The system 10 may also be used to modify operating parameters of the systems 30 and components 32 of the facility 12 in response to forecasted environmental conditions. For example, as described above, the environmental data 72 from the environmental service 14 is retrieved and stored in the database 130 as the environmental data 142. Thus, the environmental data 142 may include forecasted weather conditions that may or will be affecting the vicinity of the facility 12, such as, but not limited to, weather front movement and conditions, humidity information, wind and precipitation forecast information, or expected outdoor temperature data and cloud conditions. Using the environmental data 142, the analysis engine 120 determines and initiates changes to the operating parameters of the systems 30 and components 32 to increase energy usage efficiency. For example, if the environmental data 142 contains information corresponding to an impending weather front in the vicinity of the facility 12, systems 30 and components 32 of the facility 12 used to control the internal environment of the facility 12 may be adjusted prior to arrival of the weather front to decrease energy usage while maintaining a substantially constant condition internal to the facility 12.

The validation engine 122 is used to validate the energy consumption information of the facility 12 to ensure that the energy consumption information is complete and accurate. For example, the data collectors 40 and sensors 42 acquire energy consumption data 44 corresponding to the systems 30 and components 32. If data collected or computed by a particular data collector 40 and/or sensor 42 remains substantially constant over a predetermined period of time or abnormally low or high values are obtained, the data collector 40 and/or sensor 42 may generate a signal indicating the possibility of incorrect information, equipment malfunction, or other associated cause. In response to the signal, the validation engine 122 validates the information acquired or computed by the data collector 40 and/or sensor 42 using other information or external variables, such as, but not limited to, the environmental data 142 and/or historical values collected or computed by the data collector 40 and/or sensor 42.

The control engine 124 receives signals or information from the analysis engine 120 corresponding to modifications to operating parameters of the systems 30 and/or components 32. For example, if a modification to an operating parameter of a particular system 30 is desired to increase operational efficiency of the system 30 or a component 32 of the system 30, the control engine 124 initiates the operating parameter change by communicating the operating parameter change modification instructions via the communications network 16 to one or more of the control systems 50. The control engine 124 may format or otherwise manipulate the operating parameter modification information to correspond to the type of modification instructions required by the designated system 30 and/or component 32. The routing engine 128 may be used to determine which control system 50 corresponds to the designated system 30 such that the routing engine 128 coordinates the transfer of the operating parameter modification information to the appropriate control systems 50.

The control engine 124 may also be used to modify or regulate the rate of data collection by the data collectors 40 and/or sensors 42 or other operating parameters associated with the data collectors 40 and/or sensors 42. For example, the analysis engine 120 may be configured having a predetermined set of data collection criteria corresponding to the data collectors 40 and/or sensors 42. The data collection criteria may include, but not be limited to, the rate of data collection, the time intervals for transferring the information to the system 10, the computations or calculations performed by each data collector 40 and/or sensor 42, the type of information acquired or stored by each of the data collectors 40 and/or sensors 42, or other operating parameters associated with the data collectors 40 and sensors 42. The control engine 124 communicates control signals via the communications network 16 to designated data collectors 40 and/or sensors 42 to modify or regulate the operating parameters of the designated data collector 40 and/or sensor 42.

The reporting engine 126 generates reports corresponding to the energy consumption of the facility 12. For example, the reporting engine 126 may generate reports associated with operating parameters of the systems 30 and/or components 32, the operating efficiency of the systems 30 and/or components 32, operating parameter modifications, overall energy consumption or usage by the facility 12, charts or graphs of the energy consumption of the facility 12 for particular time periods, improvements to energy usage efficiency, or other types of information collected and/or associated with the energy consumption of the facility 12. The reporting engine 126 may also provide a real-time display of the energy consumption information associated with the facility 12 for viewing and analysis by an operator of the system 10. The reports generated using the reporting engine 126 may be transmitted to the output device 104 or communicated via the communications network 16 to a desired party.

Thus, the present invention provides remote monitoring and control of energy consumption of a facility 12. The system 10 may be used to monitor and remotely modify operating parameters of the systems 30 and/or components 32 of the facility 12 to increase energy usage efficiency in response to current and forecasted energy consumption conditions. The system 10 may also be used to maintain information integrity associated with the energy consumption of the facility 12, for example, by monitoring and remotely controlling data acquisition corresponding to energy consumption of the systems 30 and components 32.

Figure 3:
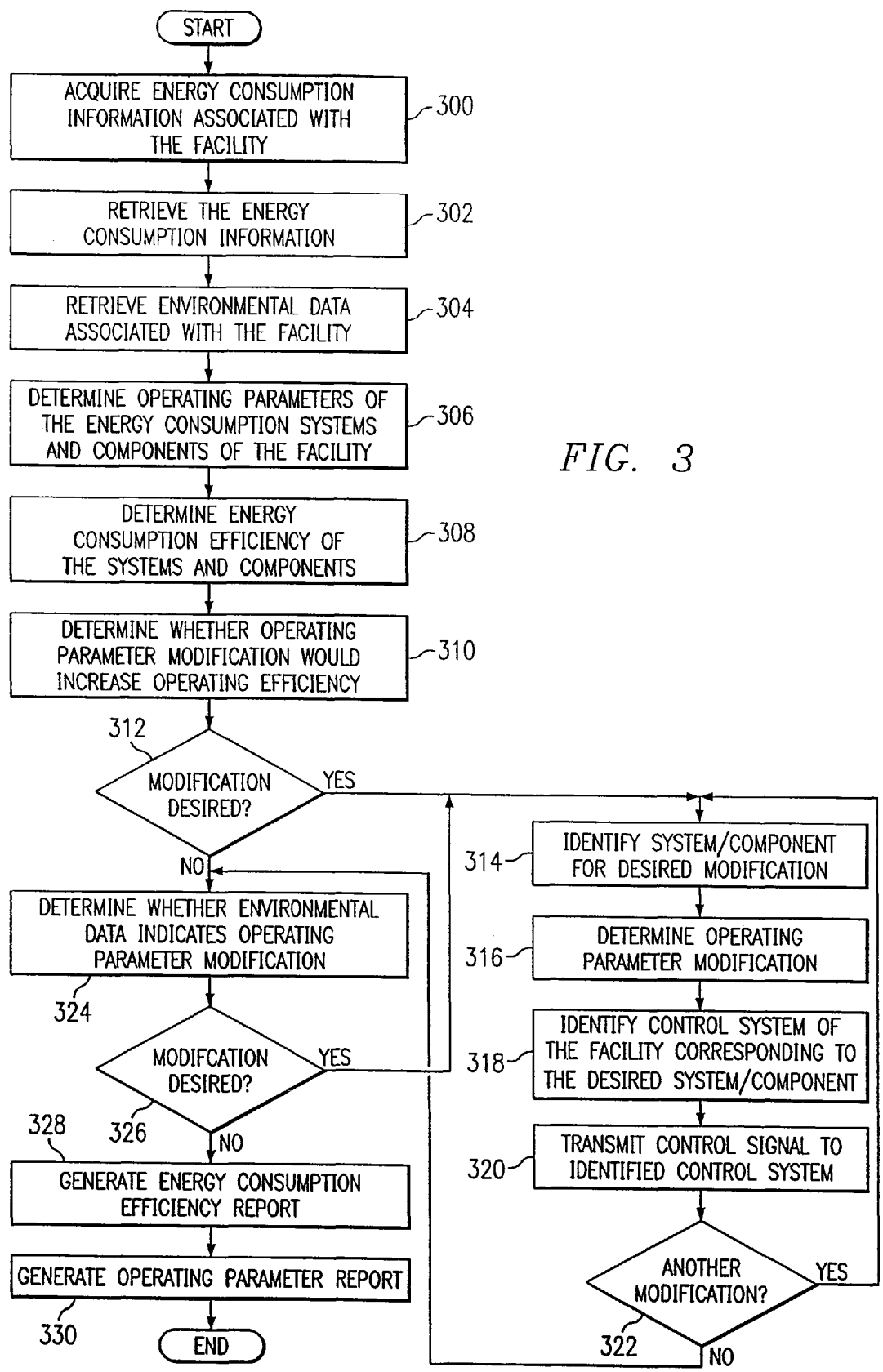
FIG. 3 is a flow chart illustrating a method of remote monitoring and controlling of facility energy consumption in accordance with an embodiment of the present invention.

FIG. 3 is a flow chart illustrating a method for remote monitoring and controlling energy consumption in accordance with an embodiment of the present invention. The method begins at step 300, where energy consumption information associated with the facility 12 is acquired. For example, the data collectors 40 and/or sensors 42 may be used to collect information associated with various energy consumption systems 30 and components 32 of the facility 12 and store, compute, or otherwise manipulate the acquired information as the energy consumption data 44. At step 302, the system 10 retrieves the energy consumption information acquired by the data collectors 40 and/or sensors 42 via the communications network 16. As described above, the system 10 may actively initiate contact with the data collectors 40 and/or sensors 42 or, alternatively, the data collectors 40 and/or sensors 42 may periodically or, in response to a predetermined event, initiate contact with the system 10 to transfer the acquired energy consumption information via the communications network 16 to the system 10.

At step 304, the system retrieves the environmental data 72 from the environmental service 14 via the communications network 16. The environmental data 72 generally corresponds to the acquired energy consumption information and may also include environmental forecast information associated with the facility 12. At step 306, the analysis engine 120 determines the operating parameters of the energy consumption systems 30 and/or components 32 using the energy consumption data 140 and/or the environmental data 142. At step 308, the analysis engine 120 also determines energy consumption efficiency for the systems 30 and/or components 32 using the energy consumption data 140 and/or the environmental data 142.

At step 310, the analysis engine 120 determines whether a modification to the operating parameters of particular systems 30 and/or components 32 would result in an increase in operating efficiency, thereby reducing energy consumption. At decisional step 312, a determination is made whether the operating parameter modification is desired. If the operating parameter modification is desired, the method proceeds from step 312 to step 314, where the analysis engine 120 identifies the particular system 30 and/or component 32 for the desired operating parameter modification. At step 316, the analysis engine 120 determines the operating parameter modification corresponding to the designated system 30 and/or component 32. At step 318, the control engine 124 identifies the control system 50 associated with the designated system 30 and/or component 32 to facilitate implementation of the operating parameter modification. At step 320, the control engine 124 transmits a control signal to the identified control system 50 to initiate the operating parameter modification. As described above, the routing engine 128 may also be used to identify and route the control signals from the control engine 124 to the appropriate control systems 50.

At decisional step 322, a determination is made whether another operating parameter modification is desired. If another operating parameter modification is desired, the method returns to step 314 and proceeds as outlined above. If another operating parameter modification is not desired, the method proceeds to step 324. As described above, the method also proceeds to step 324 when an operating parameter modification is not desired at step 312.

At step 324, the analysis engine 120 determines whether the environmental data 72 indicates that a modification to operating parameters of particular systems 30 and/or components 32 would increase operating efficiency and reduce energy consumption. At decisional step 326, a determination is made whether the operating parameters modification is desired. If the operating parameters modification is desired, the method proceeds from step 326 to step 314 and proceeds as described above. If the operating parameters modification is not desired, the method proceeds from step 326 to step 328, where the reporting engine 126 generates an energy consumption efficiency report for the facility 12. The energy consumption efficiency report may include information associated with energy consumption prior to and after operating parameters modification as well as a variety of other types of energy consumption analyses and comparisons. At step 330, the reporting engine 126 also generates an operating parameters report. The operating parameter(s) report may include information associated with operating parameters of the systems 30 and/or components 32 prior to and after operating parameters modification. However, the operating parameters report may also include other types of information associated with the operating parameters of the systems 30 and/or components 32.

Figure 4:
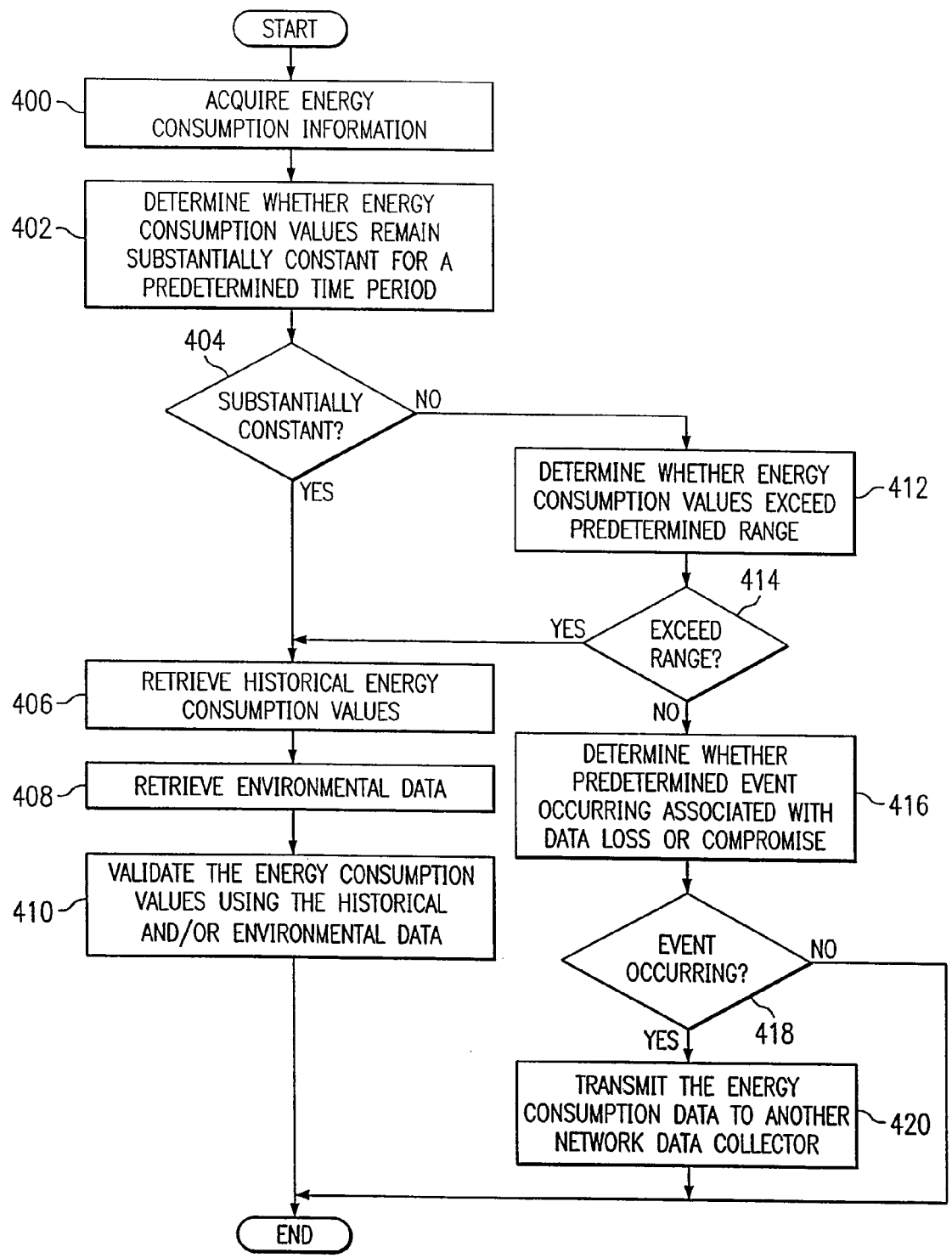
FIG. 4 is a flow chart illustrating another method for remote monitoring and controlling of facility energy consumption in accordance with an embodiment of the present invention.

FIG. 4 is a flowchart illustrating another method for remote monitoring and controlling of facility energy consumption in accordance with an embodiment of the present invention. The method begins at step 400, where the data collectors 40 and/or sensors 42 acquire energy consumption information associated with the systems 30 and components 32 of the facility 12. As described above, the energy consumption information may be stored as the energy consumption data 44. At step 402, a determination is made whether energy consumption values acquired by the data collectors 40 and/or sensors 42 remain at a substantially constant value over a predetermined period of time. The data collectors 40 may be configured to compare historical energy consumption values for a predetermined period of time to make the required determination. However, the analysis engine 120 and/or validation engine 122 may also make the required comparison using communicated energy consumption information via the communications network 16 from the data collectors 40 and/or sensors 42.

At decisional step 404, a determination is made whether the energy consumption values acquired remain substantially constant over the predetermined period of time. If the energy consumption values have remained substantially constant for the predetermined time period, the method proceeds from step 404 to step 406, where the validation engine 122 retrieves historical energy consumption values to compare with the energy consumption values remaining substantially constant. At step 408, the validation engine 122 also retrieves the environmental data 142 corresponding to both the historical energy consumption values and the energy consumption values remaining substantially constant.

At step 410, the validation engine 122 validates the energy consumption values remaining substantially constant using the historical energy consumption values and/or the environmental data 142. Thus, the validation engine 122 compares the historical energy consumption values corresponding to the particular system 30 and/or component 32 with the real-time acquired energy consumption values and/or the environmental data 142 corresponding to the historical and real-time energy consumption values to determine whether inaccuracies are present in the real-time energy consumption values. If inaccuracies are present within the real-time acquired energy consumption values, the validation engine 122 may generate an alarm or alert signal indicating that data collection corresponding to a particular system 30 or component 32, as well as a particular data collector 40 or sensor 42, requires attention.

If the energy consumption values do not remain substantially constant for the predetermined time period, the method proceeds from decisional step 404 to step 412, where a determination is made whether the acquired energy consumption values exceed a predetermined range of values. As described above, either the validation engine 122, the data collector 40, and/or the sensor 42 may make the required comparison to determine whether the real-time acquired energy consumption values exceed the predetermined range. If the energy consumption values exceed the predetermined range, the method proceeds from decisional step 414 to step 406, where validation of the acquired energy consumption values takes place. If the acquired energy consumption values do not exceed the predetermined range, the method proceeds from step 414 to step 416, where a determination is made whether a predetermined event has occurred or is impending associated with data loss or a compromise of the acquired data. For example, as described above, low battery power conditions or other events may be associated with inaccurate data collection, storage, or transmittal. If the predetermined event has occurred or is imminent, the method proceeds from decisional step 418 to step 420, where the data collector 40 transmits the acquired energy consumption data 44 to another data collector 40. Thus, the coupled data collectors 40 provide a network for shared energy consumption information. If the predetermined event has not occurred and/or is not imminent, the method ends.

Figure 5:
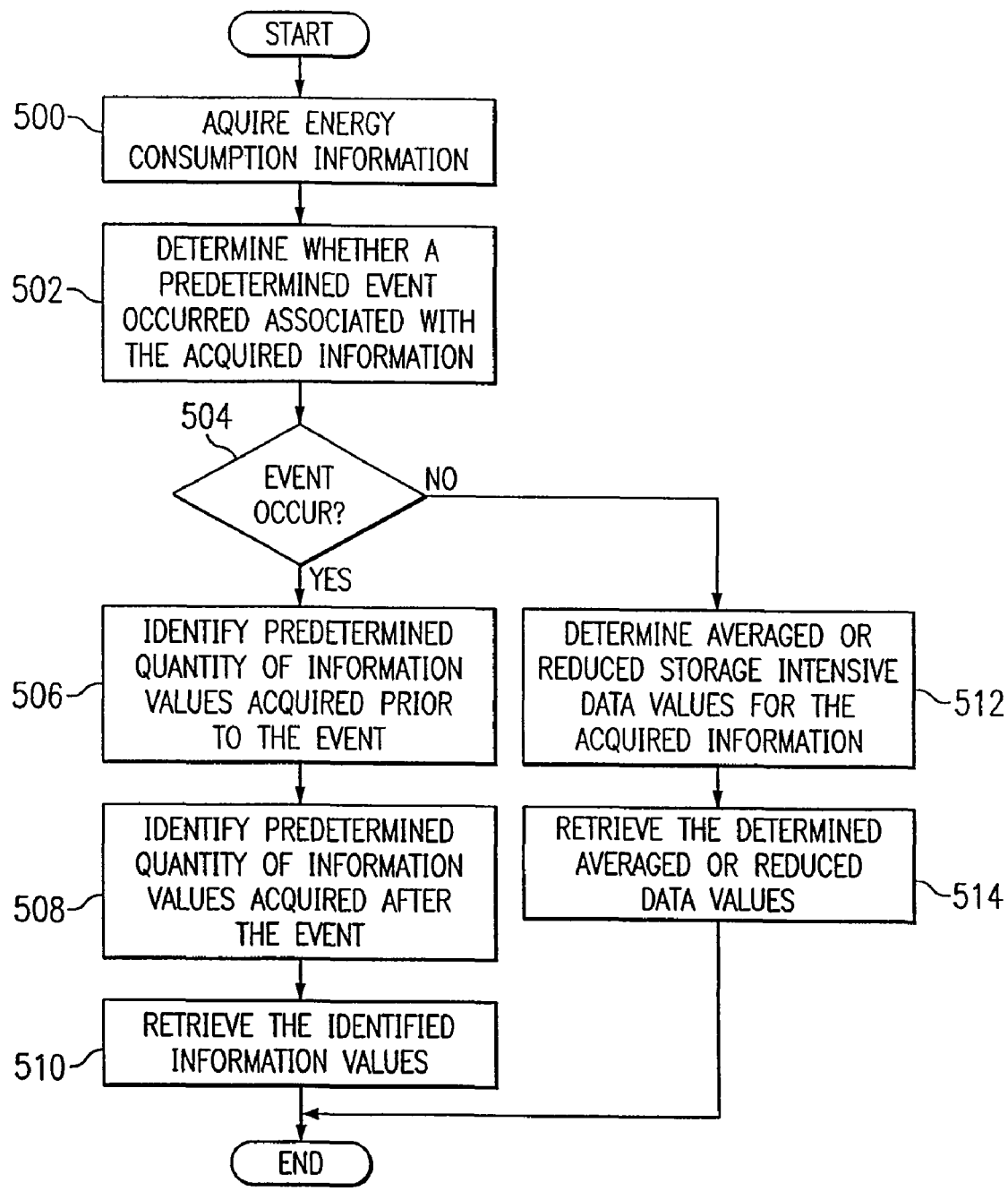
FIG. 5 is a flow chart illustrating another method for remote monitoring and controlling of facility energy consumption in accordance with an embodiment of the present invention.

FIG. 5 is a flowchart illustrating another method for remote monitoring and controlling of facility energy consumption in accordance with an embodiment of the present invention. The method begins at step 500, where the data collectors 40 and/or sensors 42 acquire energy consumption information associated with the systems 30 and components 32 of the facility 12. At step 502, a determination is made whether a predetermined event has occurred associated with the acquired energy consumption information. For example, abnormally high or low energy consumption values associated with the systems 30 and/or components 32 may indicate increased energy consumption demands, system 30 or component 32 malfunction, or other related information. If the predetermined event has occurred, the method proceeds from decisional step 504 to step 506, where a predetermined quantity of energy consumption information values acquired prior to the predetermined event is identified. At step 508, a predetermined quantity of energy consumption information values acquired after the predetermined event is identified thus, at steps 506 and 508, energy consumption information occurring immediately prior to and after the predetermined event is identified, thereby providing increased analysis capability corresponding to the predetermined event. At step 510, the system 10 retrieves the identified energy consumption information values occurring prior to, during, and after the predetermined event.

If the predetermined event has not occurred, the method proceeds from decisional step 504 to step 512, where an averaged energy consumption value is determined for the acquired information over a predetermined time period. For example, if no significant events occur during energy consumption information acquisition indicating abnormal conditions, the acquired information may be manipulated to a reduced storage intensive data value corresponding to the predetermined time period. At step 514, the system 10 retrieves the averaged or reduced energy consumption data values for the predetermined time period.

Accordingly, the present invention provides an improved system for remote monitoring and controlling of energy consumption systems 30 and components 32 of the facility 12 that substantially reduces or eliminates costly and time consuming site visits to the facility 12. Thus, energy consumption efficiency may be readily determined and operating parameter modifications to the systems 30 and components 32 of the facility 12 may be identified and implemented remotely from the facility 12. Additionally, the present invention provides greater energy consumption information integrity than prior systems and methods by providing validation of the acquired energy consumption information in response to predetermined events.

Although the present invention has been described in detail, various changes and modifications may be suggested to one skilled in the art. It is intended that the present invention encompass such changes and modifications as falling within the scope of the appended claims.

What is claimed is:

1. A system for remote monitoring and controlling of energy consumption of a facility, comprising:
   a processor;
   a database coupled to the processor, the database operable to receive and store energy consumption data associated with the facility;
   a memory coupled to the processor;
   an analysis engine residing in the memory and executable by the processor, the analysis engine operable to evaluate the energy consumption data and determine whether energy consumption operating parameters require modification to increase efficiency; and
   a control engine residing in the memory and executable by the processor, the control engine operable to initiate operating parameter modification of an energy consumption system of the facility in response to a desired operating parameter modification.

2. The system of claim 1, wherein the database receives the energy consumption data via an Internet communications network.

3. The system of claim 1, wherein the database receives the energy consumption data from a data collector disposed at the facility.

4. The system of claim 1, wherein database further receives and stores environmental data, and wherein the analysis engine is further operable to determine whether operating parameter modification is required using the environmental data.

5. The system of claim 4, wherein the environmental data comprises environmental forecast information, and wherein the analysis engine is operable to determine whether operating parameter modification is required for the energy consumption system using the environmental forecast information.

6. The system of claim 1, further comprising a reporting engine residing in the memory and executable by the processor, the reporting engine operable to generate an energy consumption report based on the energy consumption data.

7. The system of claim 1, further comprising a validation engine residing in the memory and executable by the processor, the validation engine operable to validate the energy consumption data.

8. The system of claim 7, wherein the validation engine is operable to validate the energy consumption data using environmental data.

9. The system of claim 7, wherein the validation engine is operable to validate the energy consumption data using historical energy consumption data associated with the facility.

10. The system of claim 1, wherein the control engine is further operable to control a rate of energy consumption data collection at the facility.

11. The system of claim 1, wherein the control engine is further operable to modify a rate of energy consumption data collection at the facility in response to a predetermined sequence of events.

12. The system of claim 1, further comprising a plurality of data collectors disposed at the facility and operable to acquire energy consumption information associated with the facility.

13. The system of claim 12, wherein the data collectors are coupled together, and wherein one of the data collectors is operable to transmit the respective acquired energy consumption information to another data collector.

14. The system of claim 13, wherein the one data collector is operable to transmit the respective acquired energy consumption information in response to a predetermined event.

15. A method for remote monitoring and controlling of energy consumption of a facility, comprising:
receiving energy consumption data associated with the facility at a processor disposed remotely from the facility;
receiving environmental data associated with the facility;
determining whether an operating parameter of an energy consumption system of the facility requires modification to increase efficiency using the energy consumption data and the environmental data; and
automatically modifying the operating parameter of the energy consumption system corresponding to the required modification.

16. The method of claim 15, wherein receiving the energy consumption data comprises receiving the energy consumption data via an Internet communications network.

17. The method of claim 15, wherein receiving the energy consumption data comprises receiving the energy consumption data from a data collector disposed at the facility.

18. The method of claim 15, wherein receiving the environmental data comprises receiving environmental forecast information, and wherein determining comprises determining whether the operating parameter of the energy consumption system of the facility requires modification using the environmental forecast information.

19. The method of claim 15, further comprising generating an energy consumption report based on the energy consumption data.

20. The method of claim 15, further comprising validating the energy consumption data.

21. The method of claim 20, wherein validating comprises comparing the energy consumption data to historical energy consumption information.

22. The method of claim 15, further comprising:
determining whether a value of the energy consumption data remains substantially constant for a predetermined time period; and
validating the energy consumption data if the value remains substantially constant for the predetermined time period.

23. The method of claim 15, further comprising:
determining whether a value of the energy consumption data exceeds a predetermined range for the energy consumption data; and
validating the energy consumption data if the value exceeds the predetermined range.

24. The method of claim 15, further comprising automatically controlling a rate of energy consumption data collection at the facility.

25. The method of claim 15, further comprising automatically modifying a rate of energy data collection at the facility in response to a predetermined sequence of events.

26. The method of claim 15, further comprising providing a plurality of data collectors coupled together at the facility, and wherein receiving the energy consumption data comprises receiving the energy consumption data from the data collectors.

27. The method of claim 26, further comprising:
determining whether a predetermined event occurs associated with energy consumption data loss; and
automatically transmitting energy consumption information acquired by one of the data collectors to another data collector in response to the occurrence of the predetermined event.

28. A system for remote monitoring and controlling energy consumption of a facility, comprising:
a processor;
a plurality of data collectors disposed at the facility, the plurality of data collectors operable to automatically transmit energy consumption data to the processor, the energy consumption data associated with an energy consumption system of the facility;
a memory coupled to the processor; and
an analysis engine residing in the memory and executable by the processor, the analysis engine operable to evaluate the energy consumption data and determine energy consumption efficiency of the system, the analysis engine further operable to determine whether an operating parameter modification to the system would result in an energy consumption efficiency increase.

29. The system of claim 28, wherein the plurality of data collectors is operable to automatically transmit the energy consumption data via an Internet communications network to the processor.

30. The system of claim 28, wherein the data collectors are coupled together, and wherein each of the data collectors is operable to share energy consumption data with another data collector.

31. The system of claim 28, further comprising a control engine residing in the memory and executable by the processor, the control engine operable to initiate a modification to a rate of data collection by the data collectors.

32. The system of claim 28, wherein each of the data collectors is further operable to store a history of energy consumption data values for a predetermined time period.

33. The system of claim 32, wherein each of the data collectors is operable to transmit a predetermined quantity of the energy consumption data values occurring prior to and after a predetermined event to the processor after the occurrence of the predetermined event.

34. The system of claim 33, wherein each of the data collectors is operable to determine an average energy consumption data value for a predetermined time interval and transmit the average energy consumption data value to the processor if the predetermined event does not occur.

35. The system of claim 32, wherein each of the data collectors is operable to transmit the respective energy consumption data to another data collector upon the occurrence of a predetermined event.

36. The system of claim 28, wherein the processor is further operable to access an environmental service to retrieve environmental data associated with the facility, and wherein the analysis engine is further operable to evaluate the system using the environmental data and the energy consumption data.

37. The system of claim 28, further comprising a control engine residing in the memory and executable by the processor, the control engine operable to initiate the operating parameter modification of the energy consumption system.

* * * * *